(12) United States Patent
Palem et al.

(10) Patent No.: US 8,316,249 B2
(45) Date of Patent: Nov. 20, 2012

(54) VARIABLE SCALING FOR COMPUTING ELEMENTS

(75) Inventors: Krishna V. Palem, Atlanta, GA (US); Bilge E. Akgul, Istanbul (TR); Jason M. George, Acworth, GA (US); Harry Bourne Marr, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 226 days.

(21) Appl. No.: 12/527,211

(22) PCT Filed: Feb. 15, 2008

(86) PCT No.: PCT/US2008/054084
§ 371 (c)(1),
(2), (4) Date: May 14, 2010

(87) PCT Pub. No.: WO2008/101162
PCT Pub. Date: Aug. 21, 2008

(65) Prior Publication Data
US 2010/0077402 A1   Mar. 25, 2010

Related U.S. Application Data

(60) Provisional application No. 60/890,376, filed on Feb. 16, 2007.

(51) Int. Cl.
G06F 1/26 (2006.01)
G06F 1/32 (2006.01)

(52) U.S. Cl. ........ 713/320; 713/300; 713/322; 713/323; 713/324; 714/1

(58) Field of Classification Search .................. 713/300, 713/320, 322, 323, 324; 714/1
See application file for complete search history.

(56) References Cited

U.S. PATENT DOCUMENTS

| | | | |
|---|---|---|---|
| 6,137,839 A | 10/2000 | Mannering et al. | |
| 6,389,440 B1 | 5/2002 | Lewis et al. | |
| 6,745,336 B1 * | 6/2004 | Martonosi et al. | 713/340 |
| 6,781,435 B1 * | 8/2004 | Gupta et al. | 327/407 |
| 6,996,730 B2 | 2/2006 | Bonnett | |
| 7,159,128 B2 * | 1/2007 | Lyons | 713/300 |
| 7,290,154 B2 | 10/2007 | Palem et al. | |
| 7,403,422 B2 * | 7/2008 | Kim et al. | 365/185.19 |
| 7,685,445 B2 * | 3/2010 | Arabi et al. | 713/320 |

(Continued)

FOREIGN PATENT DOCUMENTS
JP  06244885 A  *  9/1994

OTHER PUBLICATIONS

International Search Report and Written Opinion issued in co-pending, related PCT Applications No. PCT/US08/54084, mailed Jul. 22, 2008.

(Continued)

Primary Examiner — Jaweed A Abbaszadeh
(74) Attorney, Agent, or Firm — Thomas|Horstemeyer, L.L.P.

(57) ABSTRACT

Various systems, methods, and computing units are provided for variable scaling of computing elements. In one representative embodiment, a method comprises: receiving a plurality of computing resource levels; and providing one of the plurality of computing resource levels to each of a plurality of computing elements, each computing element having an associated output, the provided voltage level based upon associated output significance.

20 Claims, 7 Drawing Sheets

U.S. PATENT DOCUMENTS

| | | | |
|---|---|---|---|
| 7,701,286 B2* | 4/2010 | Gupta et al. | 330/127 |
| 8,185,774 B2* | 5/2012 | Diewald et al. | 713/502 |
| 2005/0050372 A1* | 3/2005 | Hagiwara | 713/320 |
| 2006/0095653 A1 | 5/2006 | Fleming et al. | |
| 2008/0278363 A1* | 11/2008 | Okumura | 341/155 |
| 2009/0241006 A1* | 9/2009 | Liikanen et al. | 714/752 |
| 2010/0005367 A1* | 1/2010 | Litsyn et al. | 714/758 |
| 2010/0005370 A1* | 1/2010 | Litsyn et al. | 714/774 |
| 2011/0185262 A1* | 7/2011 | Kershaw et al. | 714/776 |

OTHER PUBLICATIONS

Andrei, A., Schmitz, M. T., Eles, P., Peng, Z., and Hashimi, B. M. 2005. "Quasi-Static Voltage Scaling for Energy Minimization with Time Constraints." In Proceedings of the Conference on Design, Automation and Test in Europe—vol. 1 (Mar. 7-11, 2005). Design, Automation, and Test in Europe. IEEE Computer Society, Washington, DC, 514-519.

B. Kish, "End of Moore's Law: Thermal (Noise) Death of Integration in Micro and Nano Electronics," Physics Letters A, vol. 305, Dec. 2002, pp. 144-149.

C. Cheemalavagu, P. Korkmaz, and K. Palem, "Ultra Low-Energy Computing via Probabilistic Algorithms and Devices: CMOS Device Primitives and the Energy-Probability Relationship," Proc. 2004 Int'l Conf. Solid State Devices and Materials, Sep. 2004.

Chakrapani, L. N., Akgul, B. E., Cheemalavagu, S., Korkmaz, P., Palem, K. V., and Seshasayee, B. 2006. "Ultra-efficient (embedded) SOC architectures based on probabilistic CMOS (PCMOS) technology." In Proceedings of the Conference on Design, Automation and Test in Europe: Proceedings (Munich, Germany, Mar. 6-10, 2006). Design, Automation, and Test in Europe. European Design and Automation Association, 3001 Leuven, Belgium, 1110-1115.

Forestier, A. Stan, M.R. 2000 "Limits to voltage scaling from the low power perspective." In Proceedings of Integrated Circuits and Systems Design, pp. 365-370, Sep. 2000, Manaus Brazil.

Hegde, R. Shanbhag, N.R. 2004 "A voltage overscaled low-power digital filter IC." IEEE Journal of Solid-State Circuits, vol. 39, pp. 388-391, Feb. 2004.

K.-U. Stein. "Noise-induced error rate as limiting factor for energy per operation in digital ics." IEEE Journal of Solid-State Circuits, SC-31(5), vol. 12, Iss. 5, pp. 527-530, Oct. 1977.

K. V. Palem. "Computational Proof as experiment: Probabilistic algorithms from a thermodynamic perspective." Proceedings of The Intl. Symposium on Verification (Theory and Practice), Taormina, Sicily, Italy, Jun. 2003.

Korkmaz, P., Akgul, B.E.S., Palem, K.V., and Chakrapani, L.N.: "Advocating noise as an agent for ultra-low energy computing: probabilistic complementary metal-oxide-semiconductor devices and their characteristics", Jpn. J. appl. Phys. I, Apr. 2006, 56, (4B), pp. 3307-3316.

Krishna V. Palem, "Energy Aware Computing through Probabilistic Switching: A Study of Limits," IEEE Transactions on Computers, pp. 1123-1137, Sep. 2005.

M. Allam and M. Elmasry, "Low power implementation of fast addition algorithms," in Proc. of IEEE Canadian Conference on Electrical and Computer Engineering, 1998 vol. 2, May 1998, pp. 645-647.

M. Elgamel and M. Bayoumi, "Interconnect noise analysis and optimization in deep submicron technology," IEEE Circuits and Systems Magazine vol. 3, No. 4, pp. 6-17, 2003.

Meindl, James D. 1995 "Low Power Microelectronics: Retrospect and Prospect", Proceeding of the IEEE vol. 83, No. 4. Apr. 1995.

Nepal, K., Bahar, R. I., Mundy, J., Patterson, W. R., and Zaslaysky, A. 2005. "Designing logic circuits for probabilistic computation in the presence of noise." In Proceedings of the 42nd Annual Design Automation Conference (Anaheim, California, USA, Jun. 13-17, 2005). DAC'05. ACM, New York, NY, 485-490.

Shepard, K.L. Narayanan, V. 1998 "Conquering Noise in Deep-Submicron Digital ICs," IEEE Trans. Design and Test of Computers, vol. 15, pp. 51-62, 1998.

Palem, K. V., Chakrapani, L. N., Kedem, Z. M., Lingamneni, A., and Muntimadugu, K. K. 2009. "Sustaining Moore's law in embedded computing through probabilistic and approximate design: retrospects and prospects." In Proceedings of the 2009 international Conference on Compilers, Architecture, and Synthesis for Embedded Systems (Grenoble, France, Oct. 11-16, 2009). CASES '09. ACM, New York, NY, 1-10.

Chakrapani, L. N., Muntimadugu, K. K., Lingamneni, A., George, J., and Palem, K. V. 2008. "Highly energy and performance efficient embedded computing through approximately correct arithmetic: a mathematical foundation and preliminary experimental validation." In Proceedings of the 2008 international Conference on Compilers, Architectures and Synthesis for Embedded Systems (Atlanta, GA, USA, Oct. 19-24, 2008). CASES '08. ACM, New York, NY, 187-196.

L. N. B. Chakrapani and K. V. Palem. "A probabilistic Boolean logic and its meaning." Rice University, Department of Computer Science Technical Report, (TR-08-05), Jun. 2008.

Lakshmi N. B. Chakrapani, Jason George, Bo Marr, Bilge E. S. Akgul and Krishna V. Palem. "A Survey of Probabilistic CMOS Technology and Future Directions for Terascale IC Design." IFIP Int'l Fed. for Information Processing, vol. 249, pp. 101-118, 2008.

Korkmaz, P., Akgul, B.E.S., Palem, K.V., "Analysis of probability and energy of nanometre CMOS circuits in presence of noise," Electronics Letters, vol. 43, pp. 942-943, Aug. 2007.

Akgul, B.E.S., Chakrapani, L. N., Korkmaz, P., Palem, K.V. 2006. "Probabilistic CMOS Technology: A Survey and Future Directions." Proceedings of IFIP Intl. Conference on Very Large Scale Integration (VLSI-SoC), Nice, France, Oct. 16-18, 2006.

Pinar Korkmaz, Bilge E. S. Akgul and Krishna V. Palem. 2006. "Ultra-low Energy Computing with Noise: Energy-Performance-Probability Trade-offs." IEEE Computer Society Annual Symposium on VLSI (ISVLSI), Karlsruhe, Germany, Mar. 2-3, 2006.

Suresh Cheemalavagu, Pinar Korkmaz, Krishna V. Palem, Bilge E. S. Akgul and Lakshmi N. Chakrapani. 2005. "A Probabilistic CMOS Switch and its Realization by Exploiting Noise." Proceedings of IFIP Intl. Conference on Very Large Scale Integration (VLSI-SoC), Perth, Western Australia, Oct. 17-19, 2005.

Krishna V. Palem, Lakshmi N. Chakrapani, Bilge E. S. Akgul and Pinar Korkmaz. 2005. "Realizing Ultra-low Energy Application Specific SoC Architectures through Novel Probabilistic CMOS (PCMOS) Technology." Proceedings of the 2005 Intl. Conference on Solid State Devices and Materials (SSDM), Sep. 12-15, 2005.

Krishna V. Palem. "Energy Aware Algorithm Design via Probabilistic Computing: From Algorithms and Models to Moore's Law and Novel (Semiconductor) Devices." Proceedings of the Intl. Conference on Compilers, Architecture and Synthesis for Embedded Systems (CASES), Oct. 30-Nov. 1, 2003.

George, J., et al., "Probabilistic Arithmetic and Energy Efficient Embedded Signal Processing", Proceedings of the 2006 International Conference of Compilers, Architecture and Synthesis for Embedded Systems, Oct. 2006, pp. 158-168.

\* cited by examiner

VARIABLE SCALING FOR COMPUTING ELEMENTS

STATEMENT REGARDING FEDERALLY SPONSORED RESEARCH OR DEVELOPMENT

This invention was made with Government support under Contract/Grant No. F30602-02-2-0124, awarded by the Defense Advanced Research Projects Agency (DARPA) and the United States Air Force. The Government has certain rights in this invention.

CROSS-REFERENCE TO RELATED APPLICATION

This application is related to copending U.S. Provisional Application entitled "VARIABLE SCALING FOR COMPUTING ELEMENTS" Ser. No. 60/890,376, filed on Feb. 16, 2007, which is entirely incorporated herein by reference. This application also claims priority to, and the benefit of, PCT Application No. PCT/US2008/54084 entitled, "VARIABLE SCALING FOR COMPUTING ELEMENTS," filed on Feb. 15, 2008, which is entirely incorporated herein by reference.

BACKGROUND

The advancement of automated computation faces a fundamental problem: energy consumption. The most fundamental building block of binary computation is a switch, a device which models the state of a system as "0" or "1". Each time a computation is performed by a computing unit, switches transition and store a new state consuming energy and generating heat. Many applications making computations operate under a finite amount of available energy or have a finite limit on the amount of heat that can be dissipated. Thus, improving energy efficiency of computing units while maintaining or improving computational integrity is an industry-wide concern.

SUMMARY

Embodiments of the present disclosure methods and systems related to digital authentication using digitally signed images.

Briefly described, one embodiment, among others, comprises a method. The method comprising: receiving a plurality of computing resource levels; and providing one of the plurality of computing resource levels to each of a plurality of computing elements, each computing element having an associated output, the provided voltage level based upon associated output significance.

Another embodiment, among others, comprises a computational system. The computational system comprising a computing unit configured to: receive a plurality of computing resource levels; and provide one of the plurality of computing resource levels to each of a plurality of computing elements, each computing element having an associated output, the provided computing resource level based upon associated output significance.

Another embodiment, among others, comprises a computing unit. The computing unit, comprising: a plurality of unit outputs, each unit output having a corresponding significance; and a plurality of computing elements, each computing element associated with one of the plurality of unit outputs, each computing element configured to provide an element output with a probability of correctness based upon the significance of the associated unit output.

Other systems, apparatus, methods, features, and advantages of the present disclosure will be or become apparent to one with skill in the art upon examination of the following drawings and detailed description. It is intended that all such additional systems, apparatus, methods, features, and advantages be included within this description, be within the scope of the present disclosure, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Figure 1:
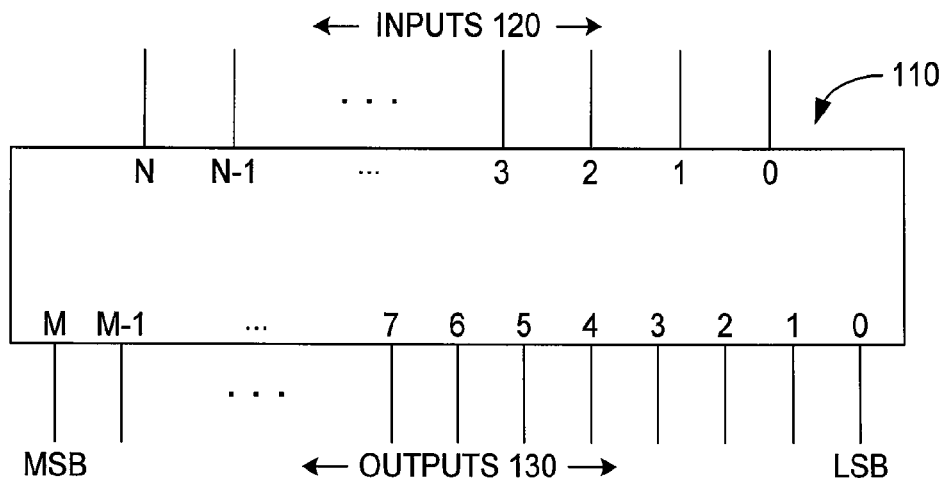
FIG. 1 is an illustration of a computing unit.

Disclosed herein are various embodiments of methods and systems related to variable scaling for computing elements. Reference will now be made in detail to the description of the embodiments as illustrated in the drawings, wherein like reference numbers indicate like parts throughout the several views.

One solution to the energy efficiency problem is scaling down the amount of energy supplied to a network of switches via a supply voltage. Using this method, a fundamental lower limit on the amount of energy per switching step can be determined. However, this fundamental limit is based upon the assumption that the switch is deterministic or that the state of the switch will always be correct (i.e., the probability of correctness is unity, p=1). Operation at a reduced voltage level affects the output correctness with a probability p. Thus, previously reliable computing constructs using a lower supply voltage produce errors that result from increased critical path delay. In some situations, energy may be reduced by supplying gates in sub-circuits that do not lie on the critical path of a computing circuit with lower supply voltages. The lower supply voltage to the sub-circuit will increase the propagation delay; however, this delay may be acceptable up to the critical path delay. Therefore, energy savings may be possible if errors resulting from the reduced voltage can be tolerated.

In some applications, propagation delay errors may be removed through error correction in a collection of techniques named algorithmic noise-tolerance (ANT). Difference-based and prediction-based error correction approaches and adaptive error cancellation (AEC) may be employed using techniques similar to echo cancellation. Reduced precision redundancy (RPR) may also be used to eliminate propagation delay errors with no degradation to the signal-to-noise ratio (SNR) of the computed output.

Energy reduction for reliable computing may also be achieved by providing multiple supply voltages to computing units. Additional energy savings are possible by addressing the supplies of computing elements associated with individual bits and utilizing the error reduction techniques that result. Using probabilistic switches in computing units allows for energy reduction while improving SNR of the computed output.

A probabilistic switch may be constructed where the state of the switch is only correct with a certain probability as disclosed in "Energy Aware Computing through Probabilistic Switching: A Study of Limits," K. Palem, *IEEE Trans. on Computers*, vol. 546, issue 9, pp. 1123-1137, September 2005, which is hereby incorporated by reference in its entirety. Such probabilistic switches can be used to produce a probabilistic bit (PBIT). In computing units using probabilistic switches, a linear decrease in the probability of correctness (p) can result in an exponential decrease in the energy consumed by this switch as discussed in "A Probabilistic CMOS Switch and its Realization by Exploiting Noise," S. Cheemalavagu, P. Korkmaz, K. Palem, B. Akgul, L. Chakrapani, *Proceedings of the International Conference on Very Large Scale Integration of System-on-Chip (IFIP-VLSI SoC)*, October 2005, which is hereby incorporated by reference in its entirety.

Thus, a reduced fundamental energy limit for probabilistic switches may be achieved by permitting the outputs of the computing (arithmetic) elements to be incorrect, albeit with a well-characterized probability parameter. In order to fully exploit the energy savings possible by the lower fundamental energy limit achieved by probabilistic switches and multiple supply voltages, variable scaling can be applied through variable biasing of computing resources, which include but are not limited to voltage supplies.

Computing elements that incorporate probabilistic switches can be used to construct probabilistic computing units such as M-bit adders and multipliers. An output array of M probabilistic bits (PBITs) can be formed where each output bit is correct with a probability of p. Bit biasing can provide a way to correct or limit the magnitude of bit errors produced by the PBIT array. In one embodiment, bit biasing scales the energy supplied to the computing elements associated with each output bit by a varying amount based upon the significance of the output bit. The least significant bit (LSB) of a logic unit may have exponentially less impact on the magnitude of the result, thus the computing unit may tolerate a lower probability of correctness in the LSB. This may allow a lower supply voltage to be provided to the computing elements associated with the LSB, resulting in energy savings. As the bit significance increases, a higher probability of correctness and higher supply voltage may be desired to achieve a correct result. This results in biasing each bit (and the associated computing elements used to compute each bit) with a given supply voltage allowing for tunable energy savings and probability of correctness. In many computing units, output bit significance is correlated with output position.

Computing units are widely used in computational systems. Computational systems can include any system that utilizes digital circuitry or processors to perform data manipulation such as, but not limited to, individual or interconnected electronic devices that compute outputs based upon input data and/or control signals. These computational systems can include personal and main frame computers, as well as units designed to perform specific tasks such as, but not limited to, signal processing, data gathering, and process control. Examples include, but are not limited to, cellular telephones, digital cameras, printers, televisions, and satellites. Computational systems may also include circuits on the board or chip level such as, but not limited to, pseudo-random number generators, Fast Fourier Transforms, modems, and engine controls in trucks and automobiles.

FIG. 1 is an illustration of a computing unit 110. A computing unit 110 is a component that maps N inputs 120 to M outputs 130 ($N \geq 1, M \geq 1$). A computing unit 110 is defined to be probabilistic if, for a given set of inputs, each of its outputs is correct with a probability p, where $p<1$. For any computing unit 110, a computation is performed by mapping a given set of N+1 inputs 120 to a resulting set of M+1 outputs 130. This mapping of inputs 120 to outputs 130 is formed by one or more computing elements. In a CMOS based computing unit, computing elements would comprise transistors and gates. In other embodiments, computing units may be based on, but not limited to, switches, interconnections, and their combinations realized using molecular electronics and/or microelectronic fabrication technologies.

The inputs and/or outputs of the computing elements collectively determine the result of the computation performed. The significance of each input and/or output in terms of determining or contributing to the resulting output value may be different. In this sense, the significance may be determined by a weight assigned to each input and/or output. In FIG. 1, the M+1 outputs 130 of the computing unit 110 are denoted M, M−1, down to 0. In this representation, the most significant bit (MSB) is represented by M and the least significant bit (LSB) is represented by 0. In other embodiments, more that one output bit 130 may be assigned the same weight or significance.

In one embodiment, the most significant bit of a computing unit 110 is assigned the largest weight of all bits and the least significant bit is assigned the smallest weight of all bits. Therefore, the inputs and/or outputs and the associated elements in a computing unit 110 are not of equal importance. The inputs, outputs, and computing elements associated with the more significant bits have a greater impact on the computation than other those associated with the least significant bits. Thus, the significance or weight of the output bits 130 can be indicated by the numeric ordering 0 through M. In other embodiments, bit significance may be determined based upon input data accuracy or round-off error of the computation. For example, if the input has an accuracy of only six bits, the output may also be considered accurate for only the six most significant bits.

Variable scaling takes advantage of the inequality in significance by allocating computing resources so that the computing elements that have a greater impact on computation receive a greater share of the available computing resources. Variable scaling can be defined to be the application of different levels of computing resources and design parameters such as, but not limited to, supply voltage, clock rates, threshold voltage, and silicon area to different computing elements within a computing unit. One example of variable scaling, namely voltage scaling, is described in "Probabilistic Arithmetic and Energy Efficient Embedded Signal Processing," J. George, B. Marr, B. Akgul, and K. Palem, *Proceedings of the 2006 International Conference on Compilers, Architecture and Synthesis for Embedded Systems* (*CASES* '06), pp. 158-168, October 2006, which is hereby incorporated by reference in its entirety.

Figure 2:
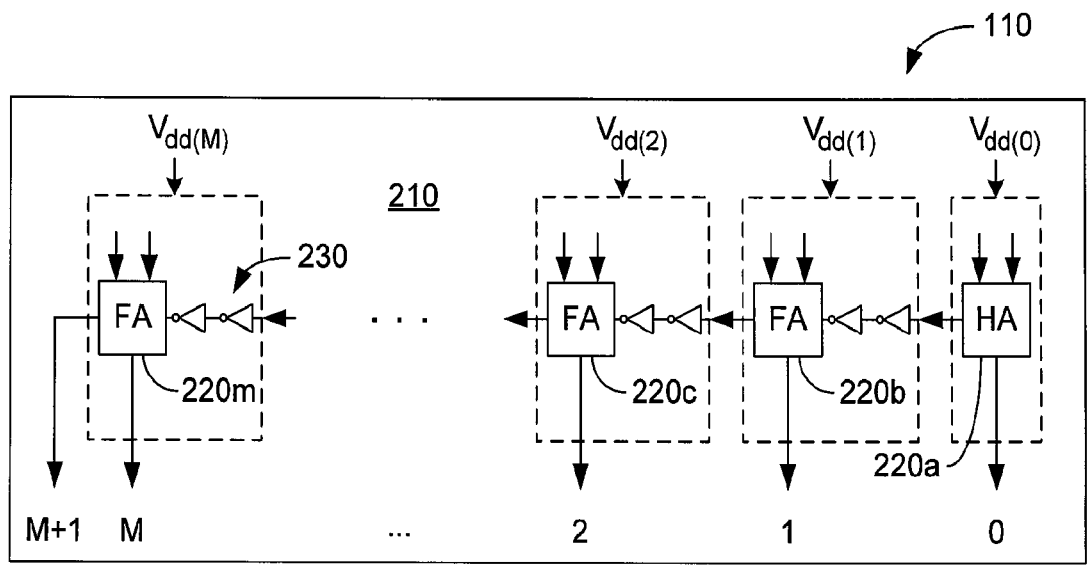
FIG. 2 is an illustration of the computing unit of FIG. 1 using probabilistic computing elements to implement a ripple-carry adder according to an embodiment of the present invention.

FIG. 2 is an illustration of the computing unit 110 of FIG. 1 using probabilistic computing elements 220 to implement a ripple-carry adder 210 according to an embodiment of the present invention. In this embodiment, probabilistic computing elements 220 include full adders (FA) 220*b*, 220*c*, 220*m* and a half adder (HA) 220*a*. Other examples of probabilistic computing elements multipliers, dividers, and in general, any two or more blocks of computing elements communicating and/or connected through an interconnect. Each computing element 220 is provided with a voltage ($V_{dd}$). In addition, each computing element 220 is associated with an output bit. For example, computing element 220*a* is associated with the least significant output bit, designated 0, while computing element 220*m* is associated with the most significant output bit, designated M. All computing elements 220 associated with an output bit are grouped together. In the embodiment of FIG. 2, each output bit has only one computing element 220 associated with it. Inverters 230 may be included to provide isolation between different voltage levels.

Figure 3:
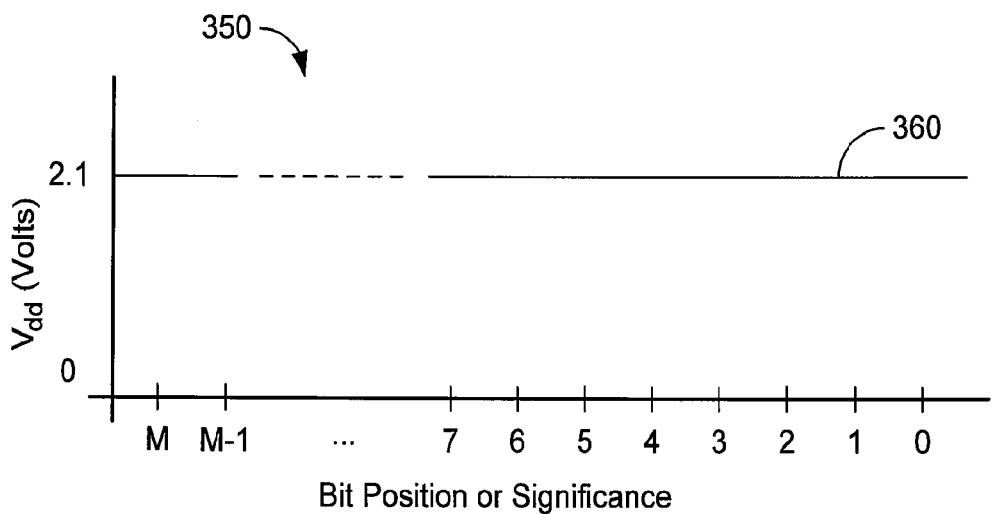
FIG. 3 illustrates a conventional voltage distribution for the computing elements of FIG. 2 according to an embodiment of the present invention.
Figure 4:
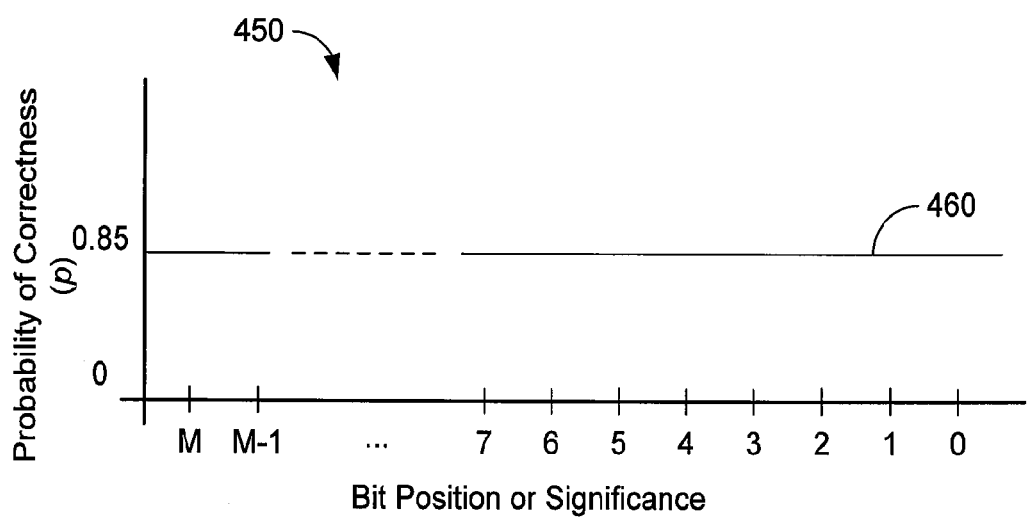
FIG. 4 illustrates a standard probability distribution for the computing elements 220 of FIG. 2 according to an embodiment of the present invention.

FIG. 3 illustrates a conventional voltage distribution 350 for the computing elements 220 of FIG. 2 according to an embodiment of the present invention. The computing elements 220 associated with output bits M down to 0 are all supplied at a uniform voltage level 360 of $V_{dd(M)}=\ldots=V_{dd(1)}=V_{dd(0)}=2.1$ Volts. FIG. 4 illustrates a standard probability distribution 450 for the computing elements 220 of FIG. 2 according to an embodiment of the present invention. In this embodiment, the probabilistic computing elements 220 are all designed to operate with the same probability of correctness 460, for example in this illustration p=0.85. Thus, the output bits of the ripple-carry adder 210 of FIG. 2 have a probability of correctness of 0.85.

Variable scaling may be applied to the supply voltage levels $V_{dd}$ of a probabilistic computing unit 110. In one embodiment, among others, higher supply voltages are allocated to the portions of the computing unit 110 that perform the computation for the most significant bits (MSBs) or outputs and lower supply voltages are allocated to the portions of the computing elements that perform the computations for the least significant bits (LSBs) or outputs. Thus, voltage scaling may depend upon the significance of the output bits. In another embodiment using variable supply voltage scaling, the number of independent voltage supply sources may be constrained to fewer than the number of inputs or outputs in the computing unit 110. Thus, the computing elements associated with more than one output bit may be provided from the same voltage supply.

To apply variable scaling in embodiments were variability is limited, the computing elements that perform the computation for inputs and/or outputs that are similar in significance or weight are grouped. These groups of computing elements are defined to be bins and all computing elements within a bin are scaled to the same level. Variable scaling is then applied to the bins according to their relative weight or significance. In some embodiments, variability at the granularity of individual inputs and outputs may be considered to have computing elements grouped into bins of size one, containing only a single computing element associated with an output bit. FIG. 2 illustrates a computing unit 110 where each bin supplied with a voltage level of $V_{dd(0)}, V_{dd(1)}, V_{dd(2)}, \ldots, V_{dd(M)}$ contains only a single computing element 220*a*, 220*b*, 220*c*, 220*m*, which are associated with output bits 0, 1, 2, ..., M, respectively.

Any varying function (e.g., linear and geometric scaling) may be used to determine the voltage level to be supplied to the computing elements of a computing unit 110. In linear variable scaling, a linear equation is defined as a function of output bit significance or bin weight and establishes the variable scaling for each bin. A general set of equations for linear variable scaling may be defined by:

$$\text{Scale}_{Bin[0]}=\text{Scale}_{Base}; \text{ and}$$

$$\text{Scale}_{Bin[K]}=\text{Scale}_{Bin[K-1]}+\delta\ K\neq 0$$

where $\text{Scale}_{Base}$ is the variable scaling base and $\delta$ is a constant difference in scale between bins. In the case of scaling the voltage level ($V_{dd}$) supplied to the computing elements of a probabilistic computing unit 110, the voltage scaling may be written as a function of the output bit significance:

$$V_{dd(K)}=V_{dd(0)}+\delta\cdot K\ K=1, 2, \ldots, L$$

where K indicates the numeric ordering of the output bits based upon their significance to the computation such that L indicates the MSB, 0 indicates the LSB, and the slope or incremental change is $$\delta=(V_{dd(L)}-V_{dd(0)})/L.$$

Figure 5:
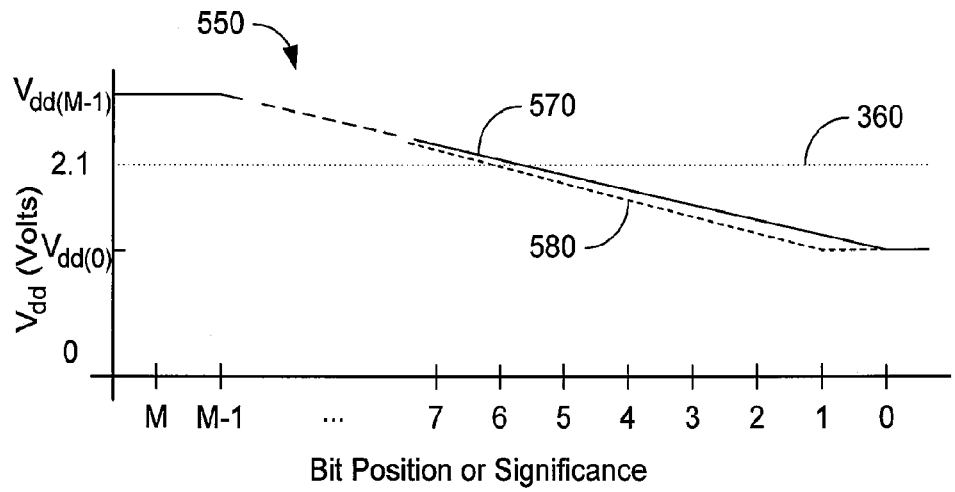
FIG. 5 illustrates a voltage distribution for the computing elements of FIG. 2 based upon linear variable scaling according to an embodiment of the present invention.

FIG. 5 illustrates a voltage distribution 550 for the computing elements 220 of FIG. 2 based upon linear variable scaling according to an embodiment of the present invention. In FIG. 5, the computing elements 220 associated with output bits 0 to M−1 are supplied at linearly increasing voltage levels 570 from $V_{dd(0)}$ to $V_{dd(M-1)}$, respectively. All computing elements (e.g., element 220*m*) associated with output bits above M−1 (e.g., bit M) are supplied at a constant voltage level equal to $V_{dd(M-1)}$. In the embodiment illustrated in FIG. 5, computing elements 220 with a higher significance or bit position are provided with voltage levels that are greater than the uniform voltage level 360 of FIG. 3 while those with lower significance are provided with voltage levels that are less than the uniform voltage level 360.

One skilled in the art would understand that incremental change or slope, $\delta$, may depend on other factors such as, but not limited to, determination of output bit significance or limitations of the power supply including number of power supplies, maximum and minimum voltage limits, refinement of voltage dividers, and adjustability of voltages. For example, if only M−2 voltage levels are available, computing elements 220*a* and 220*b* associated with output bits 0 and 1, respectively, can be supplied with the same voltage level $V_{dd(0)}=V_{dd(1)}$. Computing elements associated with output bits 2 to M−1 are supplied at linearly increasing voltage levels 580 from $V_{dd(2)}$ to $V_{dd(M-1)}$, with the computing element 220m associated with output bit M supplied with the same voltage level as the bit M−1 element, i.e. $V_{dd(M)}=V_{dd(M-1)}$. One skilled in the art understands that other variations and combinations can be derived from these simple non-limiting examples.

In geometric variable scaling, a non-linear geometric equation may be defined as a function of output bit significance or bin weight to establish the variable scaling for each bin of computing elements. An example set of equations for geometric variable scaling may be defined by the geometric series:

$$Scale_{Bin[0]}=Scale_{Base}; \text{ and}$$

$$Scale_{Bin[K]}=Scale_{Bin[K-1]}+A \cdot r^{(K-1)} K \neq 0$$

where $Scale_{Base}$ is the variable scaling base, A is the scale constant, and r is a constant ratio that defines the geometric rate between bins. As discussed for linear variable scaling, these equations can be transformed into a function or set of functions that can be used to determine the supplied voltage levels. Other embodiments may use other functions to determine variable scaling such as, but no limited to, exponential or logarithmic variations based upon the significance or position of the associated output bit. Voltages may be limited to values that produce an acceptably high or maximum probability of correctness while minimizing power consumption. Alternatively, voltage supply limitations or circuit voltage tolerance may provide upper limits to the scaling that is possible or incremental voltage changes that may be utilized.

Figure 6:
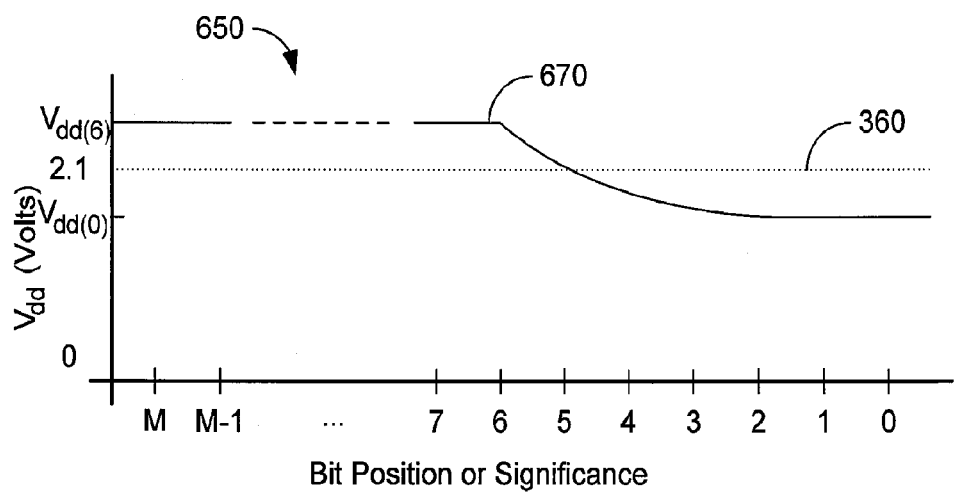
FIG. 6 illustrates a voltage distribution for the computing elements of FIG. 2 based upon geometric variable scaling according to an embodiment of the present invention.

FIG. 6 illustrates a voltage distribution 650 for the computing elements 220 of FIG. 2 based upon geometric variable scaling according to an embodiment of the present invention. In FIG. 6, the computing elements 220 associated with output bits 0 to 6 are supplied at geometrically increasing voltage levels 670 from $V_{dd(0)}$ to $V_{dd(6)}$, respectively. All remaining computing elements associated with output bits with a significance (or position) greater than bit 6 are supplied with a constant voltage $V_{dd(6)}$. Thus, in the embodiment illustrated in FIG. 6, computing elements 220 associated with output bits with a higher significance or bit position are provided with voltage levels that are greater than the uniform voltage level 360 of FIG. 3 while those associated with lower significance are provided with voltage levels that are less than the uniform voltage level 360. Variations in the variable scaling base $Scale_{Base}$, the scale constant A, and the constant ratio r will change the supplied voltage levels provided to the computing elements 220 associated with the output bits.

In addition, the transition between the voltage levels supplied to the less significant output bits and the voltage level supplied to the bits of higher significance is much shorter than in the linear scaling 570 and 580 of FIG. 5. While linear variable scaling of supply voltage shows significant improvements in reducing the impact of probabilistic errors over non-scaled implementation of FIG. 3, geometric variable scaling of supply voltage shows even further increases in reducing the impact of probabilistic errors.

One or more power supplies may be used to provide the different voltage levels provided to a computing unit 110. In one embodiment, individual voltage supplies provide each of the voltage levels $V_{dd}$. In other embodiments, the voltage supplies may provide adjustable voltage levels. Alternatively, voltage dividers or other circuitry may be utilized to provide the voltage levels $V_{dd}$ by dividing the source voltage into the different voltage levels. Voltage division may also allow for adjustment of one or more of the provided voltage levels. Voltage adjustments may be manually controlled or automatically controlled based upon a detected characteristic. For example, a voltage level may be adjusted based upon the level of detected error in the associated output bit.

Other embodiments may utilize other computing resources such as, but not limited to, clock rates provided to the computing elements. In general, computing units are supplied with a clock rate that complies with the switching speed of all computing elements. Using a clock rate higher than the maximum switching speed of a switching element may generate errors at the output bits, reducing the correctness probability of the output bits. In one embodiment, clock rates provided to computing elements may be associated with output probabilities. In this embodiment, higher clock rates cause lower probabilities of correctness while lower clock rates cause higher probabilities of correctness. Thus, while computing elements with high value information are supplied with a nominal clock rate, computing elements with low value information may be supplied with a higher clock rate. As such, the scaling of clock rates may depend upon the significance of the outputs.

In one embodiment implementing an adder, all computing elements associated with all output bits (MSB to LSB) may be provided with a high clock rate, generating errors at all bit positions. Then, error correction may be applied to the computing elements associated with the most significant outputs to reduce the impact of the errors. In this way, the probability of correctness for the MSBs are increased as desired. In one embodiment, the clock rate supplied to a computing element may be adjusted to within a threshold or range of a specified probability p. The adjustment may be performed by an operator or other means for adjustment including, but not limited to, computing circuitry, a computer system, or a processor executing code or logic. In another embodiment, scaling of clock rates may be accomplished using methods such as, but not limited to, the linear and geometric variable scaling described above.

In another embodiment, variable scaling may be applied to the probability of correctness (p) values for a probabilistic computing unit. Using the same variable scaling and/or error correction principles discussed above, higher p values may be allocated to the computing elements that perform the computation for or are associated with the most significant output bits and lower p values are allocated to the portions of the computing elements that perform the computation for or are associated with the least significant output bits. Applying variable scaling to a designed probability of the computing elements used in a computing unit may involve design choices with different granularities. In some embodiments, error correction or variable scaling may be used to the designed silicon area invested or utilized in a computing element.

Certain situations may necessitate design constraints that limit the amount of variability available for variable scaling. There are several design considerations that should be considered when designing a probabilistic computing element and/or unit. For example, a limited number of supply voltages may exist; and higher design effort may be needed for optimizing the allocation of multiple resources (e.g., $V_{dd}$) and/or for addressing other circuit level limitations or problems due to usage of multiple voltage supply connections (e.g., the need for voltage level converters between computing elements having different voltage levels).

Figure 7:
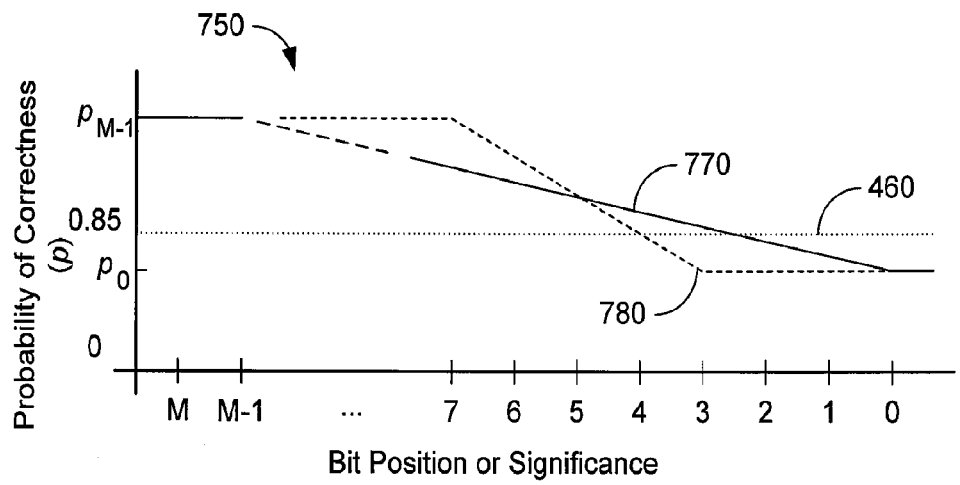
FIG. 7 illustrates a probability distribution for probabilistic computing elements of FIG. 2 based upon linear variable scaling according to an embodiment of the present invention.

FIG. 7 illustrates a probability distribution 750 for probabilistic computing elements 220 of FIG. 2 based upon linear variable scaling according to an embodiment of the present invention. In FIG. 7, the computing elements 220 associated with output bits 0 to M−1 are designed to operate with a linearly increasing probability of correctness 770 from $p_0$ through $p_{M-1}$, respectively. All computing elements (e.g., element 220m) associated with output bits above M−1 (e.g., bit M) are designed to operate with a constant probability equal to $p_{M-1}$. In the embodiment illustrated in FIG. 7, computing elements 220 with a higher significance or bit position are designed to operate with p levels that are greater than the uniform probability level 460 of FIG. 4 while those with lower significance are designed to operate with p levels that are less than the uniform probability level 460. Linear scaling of the probability of correctness can also be limited to a group of the computing elements. For example, the computing elements 220 associated with output bits 3 to 7 may be designed to operate with a linearly increasing probability of correctness 780 from $p_3$ through $p_7$, respectively. Computing elements associated with output bits above or below this range would be designed to operate at a constant $p_3$ or $p_7$, respectively. Other variations and combinations can be derived based upon these non-limiting examples.

Figure 8:
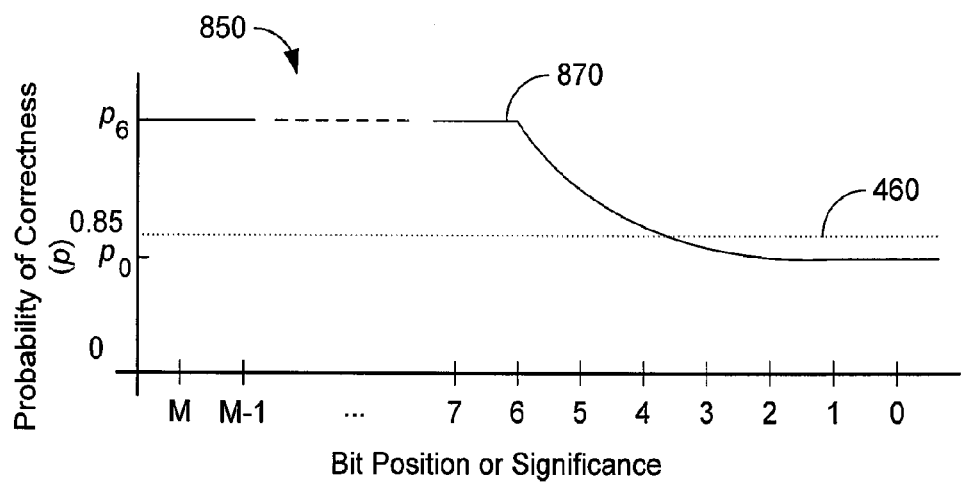
FIG. 8 illustrates a probability distribution for probabilistic computing elements of FIG. 2 based upon geometric variable scaling according to an embodiment of the present invention.

FIG. 8 illustrates a probability distribution 850 for probabilistic computing elements 220 of FIG. 2 based upon geometric variable scaling according to an embodiment of the present invention. In FIG. 8, the computing elements 220 associated with output bits 0 to 6 are designed to operate with a geometrically increasing probability of correctness 870 from $p_0$ through $p_6$, respectively. All remaining computing elements associated with output bits with a significance higher than that of bit 6 are designed to operate with a constant probability equal to $p_6$. Thus, in the embodiment illustrated in FIG. 8, computing elements 220 associated with output bits with a higher significance or bit position are designed to operate with p levels that are greater than the uniform probability level 460 of FIG. 4 while those associated with lower significance are designed to operate with p levels that are less than the uniform probability level 460. Variations in the geometric variable scaling will change the designed probability levels of the computing elements 220 associated with the output bits. One skilled in the art understands that other variations and combinations can be derived from these simple non-limiting examples.

In other embodiments, the probability distributions illustrated in FIGS. 7 and 8 may correspond directly to the probability of correctness of the output bits. In those embodiments, the computing elements associated with an output bit (or grouped in a bin) are designed to operate such that the desired output bit probability is achieved. For example, each computing element associated with an output bit may be designed to operate with the same probability of correctness such that the cumulative effect produces the desired probability of the output bit. Alternatively, each computing element associated with an output bit may be designed to operate with a different p to produce the same output probability. Error propagation could be used to determine p for the associated computing elements. In addition, various combinations can be derived based upon these non-limiting embodiments.

In other embodiments, variable scaling may be applied to other features of the probabilistic computing elements such as, but not limited to, threshold voltage of the switches. Using the same variable scaling principles discussed above, computing elements that perform the computation for or are associated with the most significant outputs are designed with lower threshold voltage values and computing elements that perform the computation for or are associated with the least significant outputs are designed with higher threshold voltage values. Applying variable scaling to the designed threshold voltage of the computing elements produces similar effects as voltage scaling, thus reducing power consumption of the computing unit. Certain situations may necessitate design constraints that limit the amount of variability available for variable scaling. It should be emphasized that combinations of two or more of the described embodiments may be utilized to improve energy efficiency. For example, combinations of scaled voltage levels and design threshold voltages may be used to provide improvements in energy efficiency as well as in performance, and hence in energy-performance product, which is similar to energy-delay product.

Figure 9:
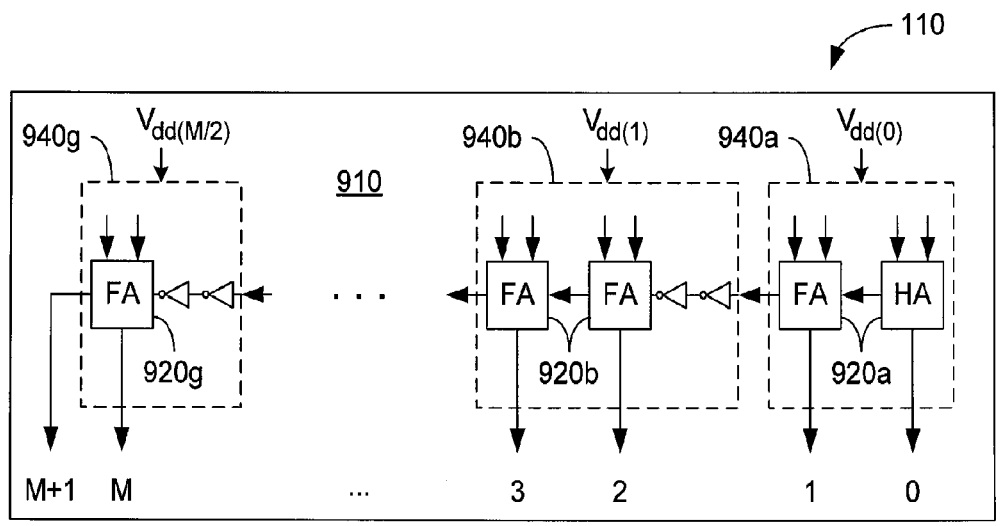
FIG. 9 is an illustration of the computing unit of FIG. 1 using probabilistic computing elements to implement a ripple-carry adder according to another embodiment of the present invention.

FIG. 9 is an illustration of the computing unit 110 of FIG. 1 using probabilistic computing elements 920 to implement a ripple-carry adder 910 according to another embodiment of the present invention. In this embodiment, probabilistic computing elements 920 associated with output bits with the same significance are grouped together in bins 940. Each computing element 920 in a bin 940 is provided with a voltage ($V_{dd}$). For example, in FIG. 9, output bits 0 and 1 are considered to have the same significance, so the associated computing elements 920a are grouped together in bin 940a. Similarly, computing elements 920b associated with output bits 2 and 3 are grouped together in bin 940b. Computing elements 920 may be grouped as a single element or as a group of multiple elements. In FIG. 9, bin 940g contains a single computing element 920g. Alternatively, in the scaling embodiment of FIG. 6, all computing elements associated with output bits 6 through M could be grouped in a single bin. As in FIG. 2, inverters may be included between scaling bins to handle voltage transitions.

In the embodiment of FIG. 9, each scaling bin 940 is provided with a separate voltage where the level for bin K is $V_{dd(K)} > V_{dd(K-1)}$. Voltage levels $V_{dd}$ may be determined using the linear and geometric scaling techniques described previously in relation to FIGS. 5 and 6. As the same voltage may be applied to computing elements 940 associated with adjacent bits, the voltage distribution would resemble a step function with different voltage levels for each step. In FIG. 9, the number of voltage levels is illustrated as M/2, however this number may change depending upon the significance (or bin grouping) of the output bits.

Figure 10:
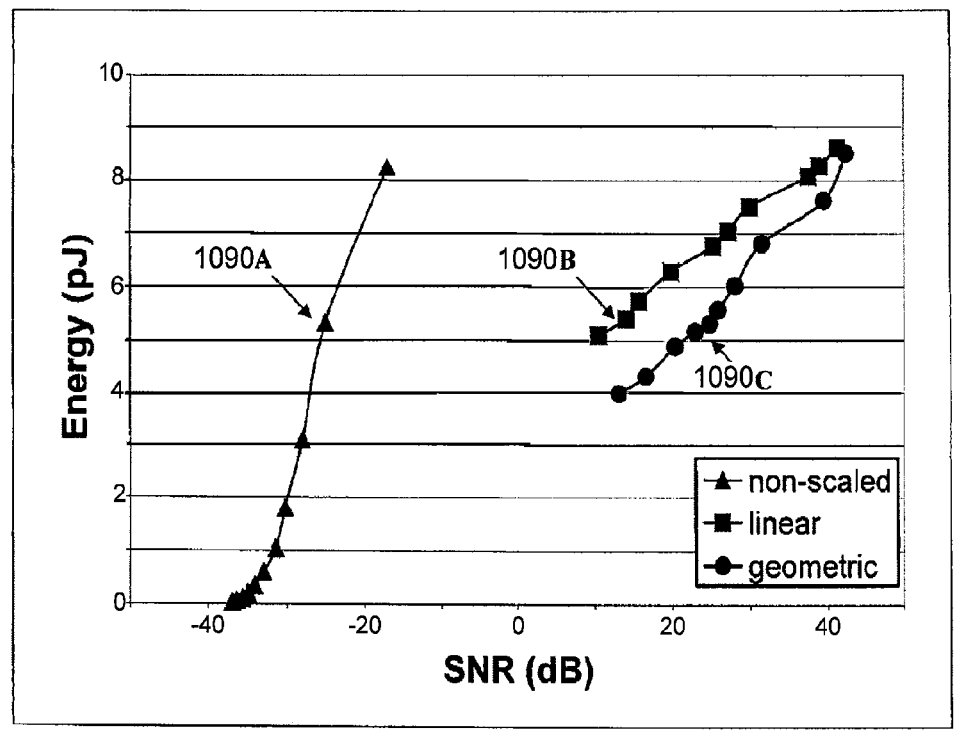
FIG. 10 is a graphical representation of the relationship between supplied energy and signal-to-noise ratio (SNR) gains for the ripple-carry adder of FIG. 9 according to an embodiment of the present invention.

FIG. 10 is a graphical representation 1090 of the relationship between supplied energy and signal-to-noise ratio (SNR) gains for the ripple-carry adder 910 of FIG. 9 according to an embodiment of the present invention. Non-scaled, linear variable scaling, and geometric variable scaling were examined. A constant voltage was provided to all computing elements 920 of the ripple adder 910. At point 1090A, non-scaled voltage levels produced a SNR value of −25 dB, while consuming 5.3 pJ of energy. Correspondingly, linear variable scaling of the voltage levels, denoted by point 1090B, consumes 5.4 pJ of energy with an SNR value of 14 dB. An equivalent geometric variable scaling of the voltage levels, denoted by point 1090C, consumes 5.3 pJ of energy with an SNR value of 25 dB.

Figure 11:
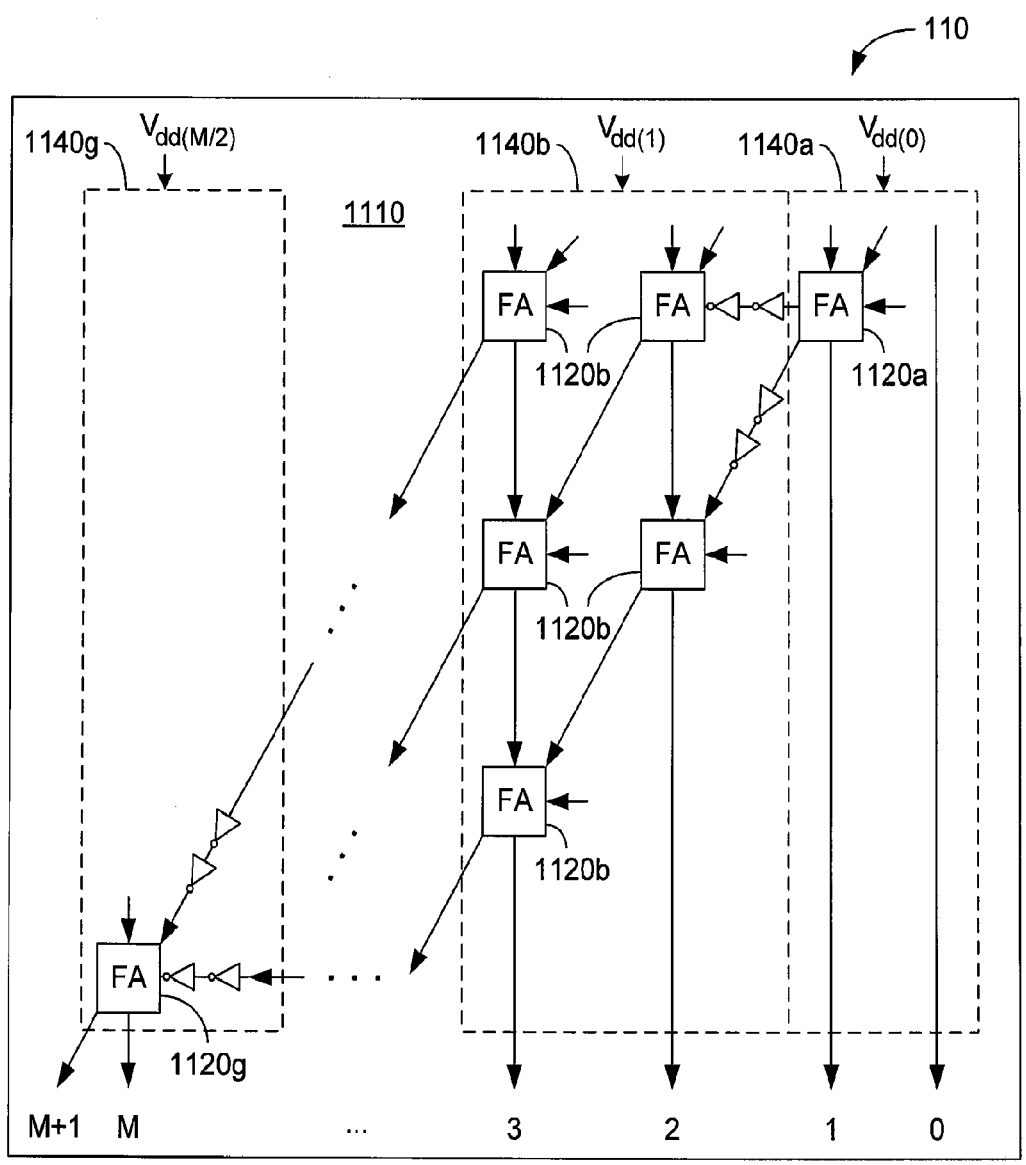
FIG. 11 is an illustration of the computing unit of FIG. 1 using probabilistic computing elements to implement an array multiplier according to an embodiment of the present invention.

FIG. 11 is an illustration of the computing unit 110 of FIG. 1 using probabilistic computing elements 920 to implement an array multiplier 1110 according to an embodiment of the present invention. In this embodiment, probabilistic computing elements 1120 associated with output bits with the same significance are grouped together in bins 1140. In this embodiment, each computing element 1120 in a column is associated with the output bit at the bottom of the column. Each computing element 1120 in a bin 1140 is provided with a voltage ($V_{dd}$). For example, in FIG. 11, output bits 2 and 3 are considered to have the same significance, so the associated computing elements 1120b are grouped together in bin 1140b. Similarly, output bits 0 and 1 are considered to have the same significance, however, for these outputs there is only a single computing element 1120a associated with output bits 0 and 1. Bins 1140 may also be associated with only one computing element 1120 such as bin 940g associated with output bit M, which contains a single computing element 920g. As in FIG. 9, inverters may be included between scaling bins to handle voltage transitions.

In the embodiment of FIG. 11, each scaling bin 1140 is provided with a separate voltage where the level for bin K is $V_{dd(K)} > V_{dd(K-1)}$. Voltage levels $V_{dd}$ may be determined using the linear and geometric scaling techniques described previously in relation to FIGS. 5 and 6. As the same voltage may be applied to computing elements 1140 associated with adjacent bits, the voltage distribution would resemble a step function with different voltage levels for each step. In FIG. 11, the number of voltage levels is illustrated as M/2, however this number may change depending upon the significance (or bin grouping) of the output bits.

Figure 12:
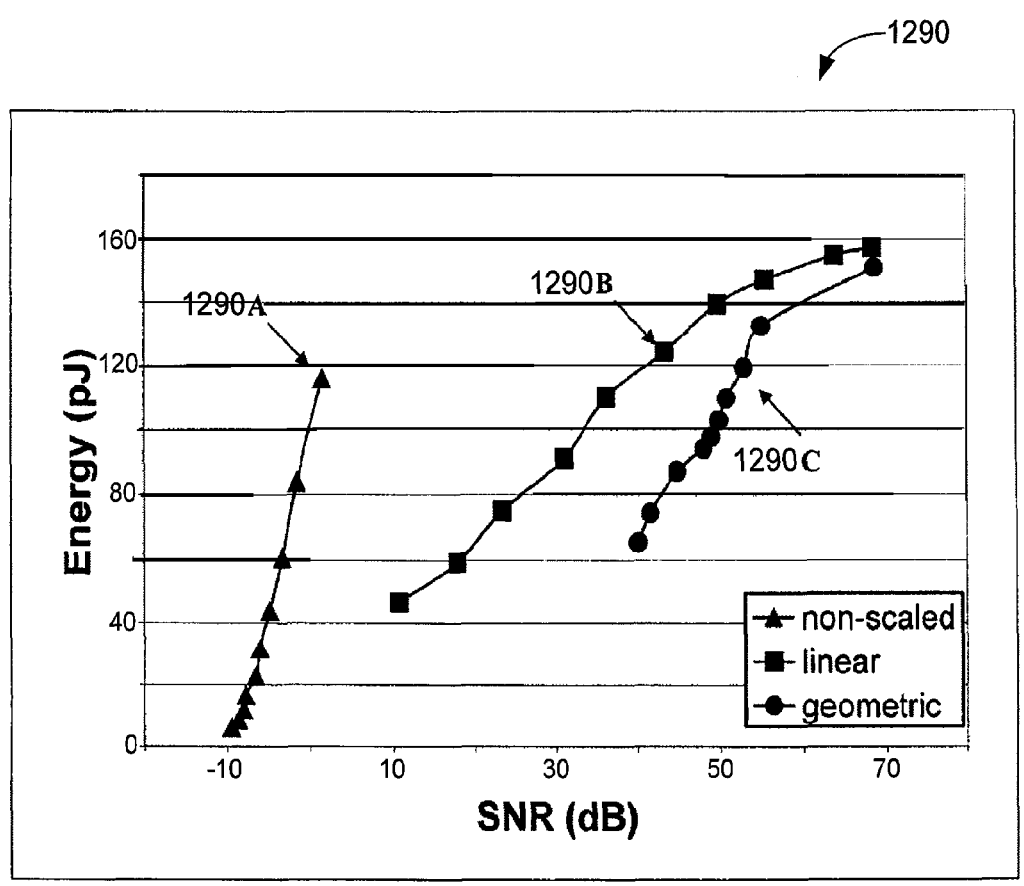
FIG. 12 is a graphical representation of the relationship between supplied energy and signal-to-noise ratio (SNR) gains for the array multiplier of FIG. 11 according to an embodiment of the present invention.

FIG. 12 is a graphical representation 1290 of the relationship between supplied energy and signal-to-noise ratio (SNR) gains for the array multiplier 1110 of FIG. 11 according to an embodiment of the present invention. Non-scaled, linear variable scaling, and geometric variable scaling were examined. A constant voltage was provided to all computing elements 1120 of the array multiplier 1110. At point 1290A, non-scaled voltage levels produced a SNR value of 1 dB, while consuming 115.8 pJ of energy. Correspondingly, linear variable scaling of the voltage levels, denoted by point 1290B, consumes 110.0 pJ of energy with an SNR value of 36 dB. An equivalent geometric variable scaling of the voltage levels, denoted by point 1290C, consumes 109.6 pJ of energy with an SNR value of 50.86 dB.

Another embodiment, among others, includes a method, comprising: receiving a plurality of computing resource levels; and providing one of the plurality of computing resource levels to each of a plurality of computing elements, each computing element having an associated output, the provided voltage level based upon associated output significance. The computing resource levels may be voltage levels. The lowest voltage level may be provided to the computing elements associated with the output with least significance. The computing resource levels may be clock rates. The associated outputs may be ordered from least significant (LS) to most significant (MS). The provided computing resource level may be based upon a function of associated output significance. The provided computing resource level may be based upon a geometric scaling function of associated output significance. The same computing resource level may be provided to each computing element associated with a group of outputs. Each computing resource level may be received from a separate source. The computing resource level of at least one separate source may be adjustable. Receiving a plurality of computing resource levels may comprise: receiving a computing resource from a source; and dividing the received computing resource into the plurality of computing resource levels. At least one of the plurality of computing resource levels may be adjustable. The method may further comprise providing a different computing resource level to at least one of the plurality of computing elements.

Another embodiment, among others, includes a computing unit, comprising: means for receiving a plurality of computing resource levels; and means for providing one of the plurality of computing resource levels to each of a plurality of computing elements, each computing element having an associated output, the provided computing resource level based upon associated output significance. The computing resource levels may be voltage levels. The highest voltage level may be provided to the computing elements associated with the output with most significance. The computing resource levels may be clock rates. The associated outputs may be ordered from least significant (LS) to most significant (MS). The provided computing resource level may be based upon a function of associated output significance. The same computing resource level may be provided to each computing element associated with a group of outputs. The means for receiving a plurality of computing resource levels may comprise: means for receiving a computing resource from a source; and means for dividing the received computing resource into the plurality of computing resource levels. The computing unit may further comprise means for adjusting at least one of the plurality of computing resource levels. The computing unit may further comprise means for providing a different computing resource level to at least one of the plurality of computing elements.

Another embodiment, among others, includes a computational system, comprising a computing unit configured to: receive a plurality of computing resource levels; and provide one of the plurality of computing resource levels to each of a plurality of computing elements, each computing element having an associated output, the provided computing resource level based upon associated output significance. The computing resource levels may be voltage levels. The computing resource levels may be clock rates. The associated outputs may be ordered from least significant (LS) to most significant (MS). The provided computing resource level may be based upon a function of associated output significance. The same computing resource level may be provided to each computing element associated with a group of outputs. The computational system may further comprise a supply configured to provide at least one of the plurality of computing resource levels. The supply may be further configured to adjust the at least one computing resource level. The at least one computing resource level may be adjusted based upon detected output error. The computational system may further comprise a second supply configured to provide a second of the plurality of computing resource levels.

Another embodiment, among others, includes a computing unit, comprising: a plurality of unit outputs, each unit output having a corresponding significance; and a plurality of computing elements, each computing element associated with one of the plurality of unit outputs, each computing element configured to provide an element output with a probability of correctness based upon the significance of the associated unit output. The unit outputs may be ordered from least significant (LS) to most significant (MS). The probability of correctness may be based upon a function of associated output significance. At least one of the computing elements may be configured with a threshold voltage such that the element output is provided with a probability of correctness based upon the significance of the associated unit output. Each computing element associated with the unit output may be configured with the threshold voltage. A group of the plurality of unit outputs may have the same corresponding significance. Each computing element associated with the group of unit outputs may be configured with a threshold voltage such that the element output is provided with a probability of correctness based upon the significance of the associated unit output.

Another embodiment, among others, includes a computational system, comprising: a computing unit comprising: a plurality of unit outputs, each unit output having a corresponding significance; and a plurality of computing elements, each computing element associated with one of the plurality of unit outputs, each computing element configured to provide an element output with a probability of correctness based upon the significance of the associated unit output.

Another embodiment, among others, includes a method, comprising: receiving a plurality of voltage levels; and providing one of the plurality of voltage levels to each of a plurality of computing elements, each computing element having an associated output, the provided voltage level based upon associated output significance. The associated outputs may be ordered from least significant (LS) to most significant (MS). The provided voltage level may be based upon a function of associated output significance. The lowest voltage level may be provided to the computing elements associated with the LS output. The provided voltage level may be based upon a geometric scaling function of associated output significance. The same voltage level may be provided to each computing element associated with a group of outputs. Each voltage level may be received from a separate voltage source. The voltage level of at least one separate voltage source may be adjustable. Receiving a plurality of voltage levels may comprise: receiving a source voltage; and dividing the source voltage into the plurality of voltage levels. At least one of the plurality of voltage levels may be adjustable. The method may further comprise providing a different voltage level to at least one of the plurality of computing elements.

Another embodiment, among others, includes a computing unit, comprising: means for receiving a plurality of voltage levels; and means for providing one of the plurality of voltage levels to each of a plurality of computing elements, each computing element having an associated output, the provided voltage level based upon associated output significance. The associated outputs may be ordered from least significant (LS) to most significant (MS). The highest voltage level may be provided to the computing elements associated with the MS output. The provided voltage level may be based upon a function of associated output significance. The same voltage level may be provided to each computing element associated with a group of outputs. The means for receiving a plurality of voltage levels may comprise: means for receiving a source voltage; and means for dividing the source voltage into the plurality of voltage levels. The computing unit may further comprise means for adjusting at least one of the plurality of voltage levels. The computing unit may further comprise means for providing a different voltage level to at least one of the plurality of computing elements.

Another embodiment, among others, includes a computational system, comprising a computing unit configured to: receive a plurality of voltage levels; and provide one of the plurality of voltage levels to each of a plurality of computing elements, each computing element having an associated output, the provided voltage level based upon associated output significance. The associated outputs may be ordered from least significant (LS) to most significant (MS). The provided voltage level may be based upon a function of associated output significance. The same voltage level may be provided to each computing element associated with a group of outputs. The computational system may further comprise a power supply configured to provide at least one of the plurality of voltage levels. The power supply may be further configured to adjust the at least one voltage level. The at least one voltage level may be adjusted based upon detected output error. The computational system may further comprise a second power supply configured to provide a second of the plurality of voltage levels.

Another embodiment, among others, includes a computing unit, comprising: a plurality of unit outputs, each unit output having a corresponding significance; and a plurality of computing elements, each computing element associated with one of the plurality of output, each computing element configured to provide an element output with a probability of correctness based upon the significance of the associated unit output. The unit outputs may be ordered from least significant (LS) to most significant (MS). The probability of correctness may be based upon a function of associated output significance. A threshold voltage of at least one of the computing elements may be configured to provide an element output with a probability of correctness based upon the significance of the associated unit output. The threshold voltage of each computing element associated with the unit output may be configured to provide an element output with the same probability of correctness. A group of the plurality of unit outputs may have the same corresponding significance. The threshold voltage of each computing element associated with the group of unit outputs may be configured to provide an element output with the same probability of correctness based upon the significance of the group of unit outputs. Each computing element associated with one of the plurality of output may be configured to provide an element output with the same probability of correctness.

Another embodiment, among others, includes a computational system, comprising a computing unit configured to: receive a plurality of clock rates; and provide one of the plurality of clock rates to each of a plurality of computing elements, each computing element having an associated output, the provided clock rate based upon associated output significance. The associated outputs may be ordered from least significant (LS) to most significant (MS). The provided clock rate may be based upon a function of associated output significance. The same clock rate may be provided to each computing element associated with a group of outputs. The computational system may further comprise a system clock configured to provide at least one of the plurality of clock rates. The computational system may further comprise a second system clock configured to provide a second of the plurality of clock rates.

It should be emphasized that the above-described embodiments of the present invention are merely possible examples of implementations, merely set forth for a clear understanding of the principles of the invention. Many variations and modifications may be made to the above-described embodiment(s) of the invention without departing substantially from the spirit and principles of the invention. Included in this are combinations of two or more of the energy saving embodiments described above. All such modifications and variations are intended to be included herein within the scope of this disclosure and the present invention and protected by the following claims. In addition, although dependent claims are delineated herein as depending from specific independent or intermediate claims, it is understood that any claim recited herein may be multiply dependent such that any claim may depend from two or more claims, or comprise a combination of any two or more claims.

Therefore, having thus described the invention, at least the following is claimed:

1. A method, comprising:
   receiving a plurality of computing resource levels, each computing resource level sufficient to enable operation of a computing element;
   providing one of the plurality of computing resource levels to each of a plurality of computing elements, each computing element having an associated output, the provided computing resource level based upon associated output significance; and outputting the output by each of the computing elements with a probability of correctness based upon the provided computing resource levels.

2. The method of claim 1, wherein the computing resource levels are clock rates.

3. The method of claim 1, wherein the associated outputs are ordered from least significant (LS) to most significant (MS).

4. The method of claim 3, wherein the provided computing resource level is based upon a function of associated output significance.

5. The method of claim 4, wherein the provided computing resource level is based upon a geometric scaling function of associated output significance.

6. The method of claim 1, wherein the same computing resource level is provided to each computing element associated with a group of outputs.

7. The method of claim 1, wherein each computing resource level is received from a separate source.

8. The method of claim 7, wherein the computing resource level of at least one separate source is adjustable.

9. The method of claim 1, wherein receiving a plurality of computing resource levels comprises:
    receiving a computing resource from a source; and
    dividing the received computing resource into the plurality of computing resource levels.

10. A computational system, comprising a computing unit configured to:
    receive a plurality of computing resource levels, each computing resource level sufficient to enable operation of a computing element;
    provide one of the plurality of computing resource levels to each of a plurality of computing elements, each computing element having an associated output bit, the provided computing resource level based upon associated output bit significance; and
    outputting the output bit by each of the computing elements with a probability of correctness based upon the provided computing resource levels.

11. The computing unit of claim 10, wherein the computing resource levels are clock rates.

12. The computational system of claim 10, wherein the associated output bits are ordered from least significant (LS) to most significant (MS).

13. The computational system of claim 10, wherein the provided computing resource level is based upon a function of associated output bit significance.

14. The computational system of claim 10, wherein the same computing resource level is provided to each computing element associated with a group of output bits.

15. The computational system of claim 10, further comprising a supply configured to provide at least one of the plurality of computing resource levels.

16. A computing unit, comprising:
    a plurality of unit outputs, each unit output having a corresponding significance; and
    a plurality of computing elements, each computing element associated with one of the plurality of unit outputs, each computing element configured to receive a computing resource level based upon the significance of the associated unit output and to provide an element output with a probability of correctness based upon the received computing resource level.

17. The computing unit of claim 16, wherein the unit outputs are ordered from least significant (LS) to most significant (MS).

18. The computing unit of claim 16, wherein the probability of correctness is based upon a function of associated output significance.

19. The computing unit of claim 16, wherein at least one of the computing elements is configured with a threshold voltage such that the element output is provided with a probability of correctness based upon the significance of the associated unit output.

20. The computing unit of claim 19, wherein each computing element associated with the unit output is configured with the threshold voltage.

* * * * *